United States Patent Office 3,375,214
Patented Mar. 26, 1968

3,375,214
PROCESS FOR PREPARING MODIFIED ALKYD RESINS HAVING INCREASED RESILIENCE AND RESISTANCE TO CRACKING
Donald Alfred Bennett, Beaulieu, England, assignor to The International Synthetic Rubber Company Limited, Southampton, England, a company of the United Kingdom
No Drawing. Filed Oct. 24, 1963, Ser. No. 318,500
Claims priority, application Great Britain, Oct. 25, 1962, 40,463/62
9 Claims. (Cl. 260—22)

Alkyd resins are prepared from a condensation product of an organic dibasic acid anhydride, for example phthalic anhydride, a polyhydroxy compound such as glycerol or pentaerythritol and an unsaturated vegetable or marine oil or fatty acid such as linseed oil fatty acid, soya bean oil fatty acids or dehydrated castor oil fatty acid, tobacco seed oil acids and stand oil. The unsaturated oil or fatty acid provides for the subsequent cross-linking and hardening of the alkyd resin to give a tough film in surface coatings.

The present invention is concerned with improving the adhesion and resistance to cracking and to water and increasing the resilience and impact strength of an alkyd resin surface coating film.

In accordance with the present invention there is provided a process for the production of an alkyd resin comprising the steps of (1) reacting a polymer of a conjugated diene with a glyceride oil, an unsaturated acid thereof or a mixture of said unsaturated acid with at least one saturated acid, the polymer of the conjugated diene being initially soluble in the glyceride oil or acid and (2) reacting the product of step (1) with an organic dibasic acid or an organic dibasic anhydride and with a polyhydroxy compound.

Polyhydroxy compounds and organic dibasic anhydrides are conventional in the production of alkyd resins and any such conventional compounds may be used in the process of the present invention.

Examples of suitable polyhydroxy compounds which may be used are glycerol, pentaerythritol, trimethylol propane, trimethylol ethane, ethylene glycol and mixtures of any of these.

Examples of suitable dibasic acids and anhydrides are phthalic anhydride, isophthalic acid, terephthalic acid, hexahydrophthalic anhydride, maleic acid, maleic anhydride, fumaric acid, fumaric anhydride, trimalitic acid and sebacic acid of these, phthalic anhydride and isophthalic acid are preferred.

The glyceride oils, unsaturated acids thereof and mixtures of unsaturated and saturated acids are those conventional in the formation of alkyd resins. The glyceride oils are vegetable or marine oils, suitable vegetable oils which may be used are safflower oil, palm oil, tung oil and preferably linseed oil and soya bean oil. Dehydrated castor oil may also be used. Suitable marine oils are cod liver oil and sperm oil.

When an acid or mixture of acids is used instead of the glyceride oil it is preferred that such acids contain from 12 to 24 carbon atoms, however this range of carbon atoms is not limiting. The saturated acids present when a mixture of unsaturated and saturated acids is used are normally those capable of oil formation but other non-oil forming acids may be present provided that the solubility of the polymer in the acid mixture is not adversely affected by their presence. Examples of acids which may be used are linseed oil fatty acids, soya bean oil fatty acids, tall oil fatty acids and dehydrated castor oil fatty acids. Tall oil contains a quantity of rosin and when tall oil fatty acids are used they may be used in admixture with the tall oil rosin or the rosin may be removed from them.

The polymer of a conjugated diene which is reacted with the glyceride oil or acid may, for example, be one of butadiene, isoprene or chloroprene or may be a copolymer of any one of these with another vinyl monomer such as styrene or vinyl toluene. The use of other vinyl monomers such as acrylates, acrylic acid and acrylonitrile is also envisaged. The criterion for deciding whether a polymer or copolymer is suitable is that it must be soluble in the glyceride oil or acid. It is preferred that the polymer of the conjugated diene should be polybutadiene or a copolymer of styrene and butadiene. Such a copolymer of styrene and butadiene suitably contains up to 30% by weight styrene.

The polymer of the conjugated diene is suitably prepared by polymerization in the presence of a catalyst. The catalyst may be a Ziegler catalyst or a free radical initiator such as peroxides, hydroperoxides, persulphates and azobisbutyronitrile. The term "Ziegler catalyst" as used herein is intended to include catalysts prepared from aluminum alkyls and metal halides. Examples of suitable catalysts are titanium tetraiodide with aluminum triethyl, lithium alkyls and such as lithium butyl. Another suitable catalyst is sodium.

Suitably styrene butadiene copolymers are prepared using a free radical initiator or sodium.

It is particularly advantageous to use, the polymer of the conjugated diene, as a substantially linear polybutadiene free from gel and easily soluble in the oil or acid and compatible with other constituents which may be added. Ziegler catalysts are suitable in the preparation of such polybutadienes. An example of such a polybutadiene is polybutadiene consisting of 45% cis 1,4 46% trans 1,4 and 9% 1,2 configurations which can be readily prepared using lithium alkyl as the polymerization catalyst. Lithium alkyl is suitably used in a hydrocarbon solvent. Such a polybutadiene is preferred and improved chemical resistance may be had by employing a polybutadiene of higher 1,2 content, or a polybutadiene which has been chemically pre-treated with an agent such as chlorine, hydrochloric acid, or hexachlorocyclopentadiene.

In general the polymerization may be carried out by any suitable method for example by emulsion or solution polymerization techniques. The choice of method is dependent on the nature of the catalyst to be used.

The molecular weight of the rubber employed preferably is usually between 5,000 and 200,000 as measured by intrinsic viscosity using the formula:

$$[\eta] = \overline{M}_v K^a$$

where:

K is $1.52 \times 10^{-9}$ $a$ is 0.8 and $\overline{M}_v$ is the viscosity average molecular weight The step of reacting the polymer of the conjugated diene with the oil or acid may be carried out by just dissolving the polymer in the oil or acid and heating the resulting solution. A suitable temperature range for the reaction is from 200–280° C. but temperatures outside these limits can be used. The amount of polymer which should be reacted with the oil or acid is limited only by the viscosity of the resulting solution which preferably should not exceed 100,000 poises at 25° C. Thus one example of a suitable amount of polymer to use is 10% by weight based on the oil of a polybutadiene having a molecular weight of about 150,000.

The reaction time for the reaction between the polymer and the oil or acid may be from 1 to 12 hours and is normally between 6 and 8 hours. The criterion for determining the reaction times is that in the final alkyd resin the polymer should be compatible with the resin. It should be long enough to cause the polymer to be compatible and not so long that the final resin will be too viscous for the purposes envisaged.

The temperatures and reaction times for the step of reacting the product of the polymer and the oil or acid with the dibasic acid or anhydride together with the polyhydroxy compound are entirely conventional for the production of alkyd resins.

The invention will now be illustrated by the following specific examples.

*Example I*

|  | Gms. |
|---|---|
| Phthalic anhydride | 148 |
| Glycerol | 106 |
| Linseed oil fatty acids | 235 |
| Polybutadiene I.V.=2.0 | 40 |

The glycerol and phthalic anhydride were heated together at 230° C. for about 15 minutes to give a resinous product. Meanwhile the fatty acids had been heated together with the polybutadiene under nitrogen at 100° C. until the polybutadiene had dissolved. A solution of suitable viscosity was obtained from reaction between the polybutadiene and unsaturated fatty acid by further heating under nitrogen at 160–170° C. and the reaction was enhanced by the addition of a very small amount of cobalt naphthenate. The polybutadiene fatty acid solution was slowly added to the glyptal resin with vigorous stirring and the reaction completed by maintaining the whole mixture at 230° C. for several hours.

*Example II*

Procedure as in Example I, except that 100 gms. of the fatty acids was replaced by 100 gms. of linseed stand oil of low-medium viscosity.

*Example III*

Procedure as in Example II, except that the glycerol was replaced by pentaerythritol.

*Example IV*

Procedure as in Example II, using a polybutadiene of I.V.=0.9.

*Example V*

Procedure as in Example III, using a polybutadiene of I.V.=0.8 and containing 50% 1,2; 35% trans 1,4 and 15% cis 1,4.

*Example VI*

Procedure as in Example II, but using a polybutadiene of I.V.=1.0 and containing 45.5% cis; 46% trans and 8.5% 1,2 configurations and which had been pre-reacted with hexachlorocyclopentadiene in the weight ratio rubber/hexachloropentadiene of 100/30 at 160° C. for 17 hours in a nitrogen atmosphere.

*Example VII*

15.5 parts of a lithium butyl polymerized polybutadiene (I.V. in toluene=1.6) were dissolved in 144 parts of linseed oil and heated for six hours at 250° C. 18.2 parts of glycerol were added and after cooling to 180° C. the mixture was heated for 4 hours at 230° C. 43.4 parts of phthalic anhydride were added and heating continued to give an acid value of 10.5 mg. KOH/g. The alkyd was diluted to 70% solids with white spirit.

*Example VIII*

A procedure essentially similar to Example VII was followed, except that soya bean oil was used in place of linseed oil.

*Example IX*

A procedure essentially similar to Example VII was followed, except that the polybutadiene had been previously modified by heating with 30% of its weight of hexachlorocyclopentadiene at 160° C. for 17 hours.

*Example X*

14.0 parts of the polybutadiene used in Example VII were dissolved in 124.8 parts of linseed oil fatty acid, and the mixture heated for 8 hours at 250° C. On cooling to 180° C, 36.6 parts of glycerol and 51.6 parts of phthalic anhydride were added and the mixture heated between 200 and 240° C. until the acid value of 10 mg. KOH/g. was attained.

What is claimed is:

1. A process for preparing a modified alkyd resin having increased resilience and resistance to cracking, comprising (1) reacting a solvent material selected from the group consisting of glyceride oil, unsaturated acids of glyceride oil, and mixtures of an unsaturated glyceride oil with at least one saturated fatty acid with a rubbery polymer of a conjugated diene, said polymer being soluble in said solvent material, and having a molecular weight in the range of 5,000 to 200,000, by heating a solute of said rubbery polymer in said solvent material to form a polymer-solvent reaction product having a viscosity not greater than about 100,000 poises at 25° C. (2) reacting the product of said polymer and said solvent with a polyhydroxy compound and a material selected from the group consisting of organic dibasic acids and organic dibasic anhydrides.

2. A process as claimed in claim 1 in which the rubbery polymer of a conjugated diene is a substantially linear polybutadiene which is gel-free.

3. A process as claimed in claim 2 in which the substantially linear polybutadiene consists of 45% cis 1,4 configuration 46% trans 1,4 configuration and 9% 1,2 configuration.

4. A process as claimed in claim 2 in which the polybutadiene has been prepared in the presence of a catalyst selected from the class consisting of aluminum alkyls, metal halides and sodium.

5. The process according to claim 1 wherein said rubbery polymer is a copolymer of a conjugated diene and a vinyl monomer.

6. A process as claimed in claim 5 in which said copolymer is one of styrene and butadiene.

7. A process as claimed in claim 6 in which said copolymer of styrene and butadiene has been prepared in the presence of a free radical initiator.

8. A process as claimed in claim 6 in which said copolymer of styrene and butadiene has been prepared in the presence of sodium as catalyst.

9. A process as claimed in claim 6 in which the copolymer of styrene and butadiene contains substantially 10% styrene.

References Cited

UNITED STATES PATENTS

| 2,634,256 | 4/1953 | Sparks et al. | 260—23.7 |
| 2,645,649 | 7/1953 | Hoffman | 260—23.7 |
| 2,662,862 | 12/1953 | Crouch. | |
| 2,689,232 | 9/1954 | Gerhart. | |
| 2,888,417 | 5/1959 | Crouch. | |
| 3,218,306 | 11/1965 | Hsieh et al. | 260—23.7 |

FOREIGN PATENTS 618,249 2/1949 Great Britain.

OTHER REFERENCES

Kraus et al.: The Rubber and Plastics Age, vol. 38, October 1957, pp. 880–881.

DONALD E. CZAJA, *Primary Examiner.*

R. W. GRIFFIN, *Assistant Examiner.*